…

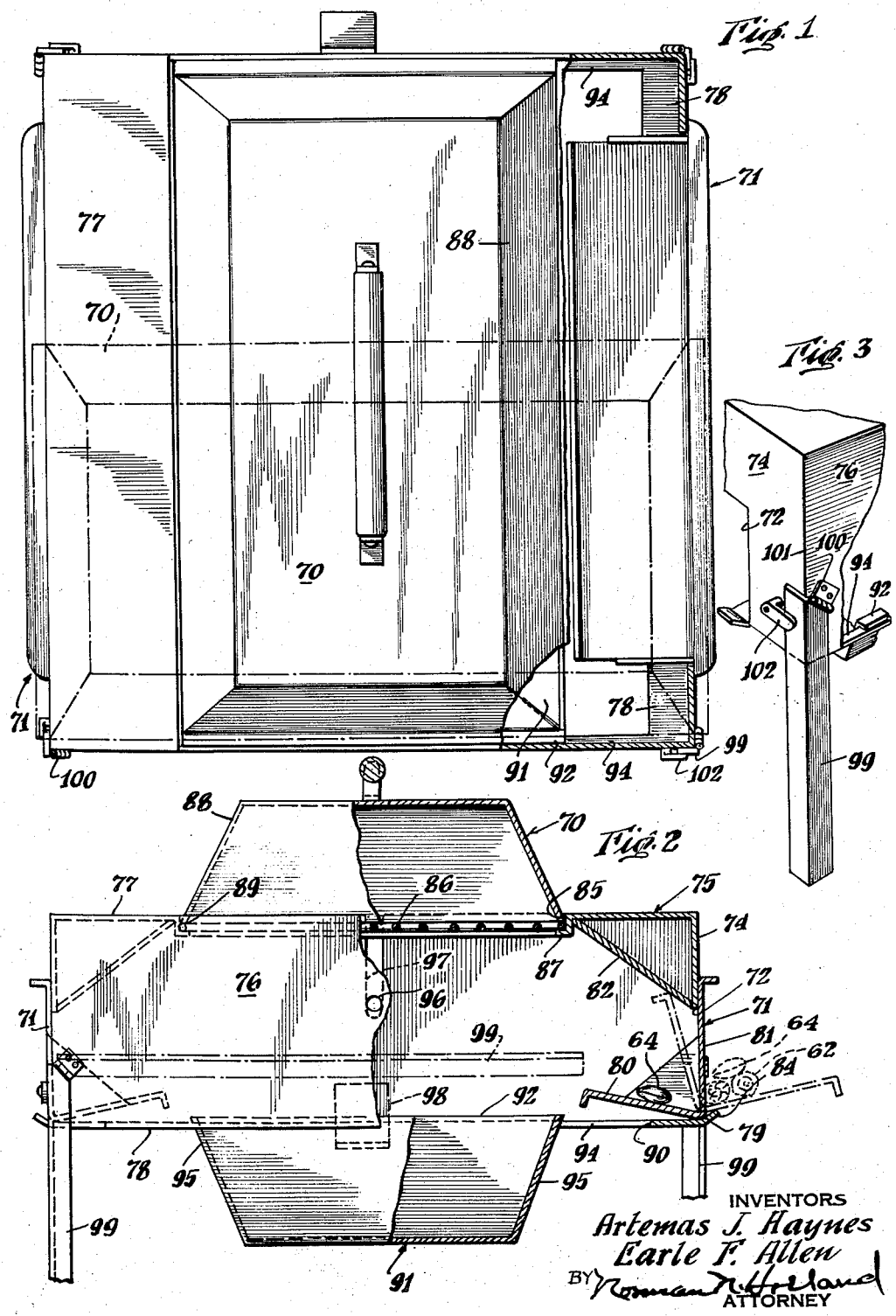

United States Patent Office

2,925,028
Patented Feb. 16, 1960

2,925,028

COOKER

Artemas J. Haynes, South Yarmouth, and Earle F. Allen, Norwell, Mass., assignors to Valentine E. Macy, Jr., New York, N.Y.

Application July 29, 1955, Serial No. 525,236

2 Claims. (Cl. 99—446)

The present invention relates to an outdoor cooker and more particularly to an improved and efficient outdoor cooker for grilling, broiling, roasting, or other cooking techniques at a controlled and even temperature.

Outdoor cooking is becoming increasingly popular and has created an enormous demand for cookers suitable for this use. It has been found desirable, especially with meat products which comprise a majority of the food cooked, to have a controlled fire so that the meat may be cooked slowly and evenly. Additionally, the outdoor cook desires a cooker on which he may duplicate cooking conditions so that once he has by trial and experience determined the temperatures and times which cook to his taste, he may then duplicate them on subsequent occasions.

There are now many forms of outdoor cookers on the market which have been used with varying degrees of success, however all of these known types contain one or more undesirable features and lack certain other desirable features.

One basic deficiency of all known types of outdoor cookers is their inability to provide a controlled temperature for the cooking period and the related inability of these cookers to duplicate the cooking conditions from one fire to the next. This shortcoming results from inefficient draft control, the lack of a planned fuel arrangement and quantity, and improper relative positioning of the firebox and the food holders.

It is also desirable to combine certain other features not found in known cookers with the ability to control temperatures and to duplicate them as set forth above. Thus it has been found desirable to have the firebox tilt out from or be removable from the cooker. This allows the fire to be started with the firebox in a convenient location for subsequent insertion in the cooker. Such a cooker may actually be used indoors or in a partially enclosed area once the fire has been started and burned until no smoke is being given off. The movable firebox also allows the fire to be adjusted and built up during the cooking period without the scattering of ashes or soot on the food. After the finish of the cooking, such a firebox is easily tilted out or removed for thorough cleaning.

Another feature desirable in cooking is the prevention of the dripping of grease or juices from the food into the fire. When grease drips into the fire, flaming, smoking, and soot formation on the cooked article occurs.

Accordingly, an object of the present invention is to provide an improved type of cooker.

Another object of the present invention is to provide an improved charcoal cooker.

Another object of the present invention is to provide a cooker having an even and precisely controlled temperature.

Another object of the present invention is to provide a cooker in which the fire conditions are readily duplicated.

Another object of the present invention is to provide a cooker in which the draft is stabilized and is not subject to random variation.

Another object of the present invention is to provide an efficient cooker with low fuel consumption.

Another object of the present invention is to provide a portable cooker adaptable for all types of cooking.

Another object of the present invention is to provide a cooker in which no grease or drippings from the food being cooked can drop into the firebox and create smoke or flame.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a top view partially cut away showing the cooker with its top in place;

Fig. 2 is an end view of the cooker of Fig. 1 partially cut away showing the cover and the drip pan in position; and Fig. 3 is a fragmentary perspective view of a corner of the cooker of Fig. 1 showing the slanted hinge construction for the folding leg.

Referring to the preferred embodiment of the cooker illustrated in Figs. 1–3, the cooker 70 has two tilting fireboxes 71. The fireboxes 71 are mounted at apertures 72 in side walls 74 of boxlike enclosure 75 which has end walls 76 and a top and a bottom 77 and 78, respectively. A slanting reflector 82 is run lengthwise of the cooker above each of the fireboxes 71 between the side walls 74 and the top 77.

The fireboxes 71 have a V-shaped cross section and they pivot on the common connected edge 79 of their bottom and side plates 80 and 81, respectively. The outer edge of the bottom 78 is bent upwardly to provide a retaining lip 84 for the firebox edge 79. When the firebox 71 is in its closed position, as seen at the left side of Fig. 2, the weight of bottom 80 holds the firebox side 81 against side wall 74 of the cooker. When the firebox 71 is swung open for starting or tending the fire during cooking, it is tilted outwardly to the position indicated by dash-dot lines in Fig. 2. The weight of side plate 81 holds firebox bottom 80 in contact with the reflectors 82 when the firebox 71 is in its open position. The firebox 71 is completely removed from the cooker by lifting the pivot edge 79 over retaining lip 84 and then withdrawing the bottom 80 from the side wall aperture 72.

The cooker top 77 has a central aperture 85 to accommodate a conventional grill 86 on downwardly formed lips 87. The grill 86 is lifted vertically from the lips 87 when it is desired to remove it from the cooker. A cover 88 is shaped so that its lower edge 89 fits above the lips 87 of aperture 85 to completely cover the grill 86 when the cover is positioned lengthwise of the cooker as shown in solid lines in Fig. 1. When it is desired to cover merely a portion of the grill 86, the cover may be turned to the crosswise position shown in dash-dot lines in Fig. 1.

An aperture 90 is provided in the bottom 78 to accommodate a drip pan 91. Lips 92 on opposite ends of the drip pan engage inwardly turned flanges 94 on end walls 76 to hold the drip pan in position. The drip pan 91 is inserted or removed by tilting it to allow the lips 92 to pass over the end wall flanges 94. An open space is left between the sides 95 of drip pan 91 and the aperture 90 to admit a draft to the fireboxes 71. Drip pan 91 is preferably shaped similarly to cover 88 so that they will nest and fit inside the cooker when the cooker is disassembled.

Hole 96 in one end wall 76 and slot 97 in the opposite end wall cooperate to support a spit for roasting. A suitable motor mounting bracket 98 is fastened to the end wall 76 beneath slot 97 to mount a conventional spit turning motor.

Legs 99 are attached to end walls 76 and side walls 74 by slanted hinges 100. The legs fold downwardly to a vertical position abutting the corner 101 between end wall 76 and side wall 74, as is shown in solid lines, and fold to an up position against the end or side walls, as is indicated in the dash-dot lines in Fig. 2. Rotatable clip 102 is swung over the leg 99 when it is in its lowered position to hold it in place. With the legs folded up and the cover and drip pan nested together and fitted inside the cooker, the cooker presents a compact package easily carried or stored.

The fireboxes are spaced from one another and from the grill 86 so that the fire heat is approximately equal at all points on the grill 86. The fireboxes are kept from beneath the grill 86 to prevent grease from dripping into the fire to cause objectionable smoke and soot. A preferred positioning of the fireboxes for even heating separates the fireboxes approximately twice the vertical distance between the grill and the fireboxes.

Operation

The cooker is prepared by folding legs 99 downwardly and clipping them in place by clips 101 and by slipping drip pan 91 into place. A preferred method of starting the cooking fire uses balls of crushed paper. A sheet of paper such as newspaper is torn into squares about ten inches on a side. The sheets are crushed and rolled tightly into paper balls and a dozen or so of these balls 62 (Fig. 2) are placed in the open or removed firebox 71 with the fuel 64 on top. The paper will burn for about 10 minutes and will completely ignite the charcoal briquets or other fuel 64. When the fuel 64 has been ignited, the firebox 4 is tilted inwardly to its closed position. The position of cover 88 is adjusted during the cooking to increase or decrease the draft to thereby increase or decrease the temperature. When smoke cooking is done, the cover 88 is used to enclose the food being cooked, and the smoke-producing material, such as hickory chips, are dropped onto the fire.

Where a long cooking period is required, the fireboxes 71 may be tilted open so that additional fuel may be added without causing the very light charcoal ash to fly about the interior of the cooker and over the food being cooked. The fireboxes also may be tilted open or removed completely should a rapid reduction of the temperature be desired.

After the completion of the cooking, both the fireboxes and the drip pans are removed for cleaning as necessary. No other portions of the cooker, except the spits and grills, will ordinarily require cleaning.

The cookers are easily fabricated from aluminum or stainless steel where a rustproof piece of equipment is desired.

It will be seen that the present invention provides an improved cooker particularly adapted for solid fuels such as charcoal briquets or similar fuels. The cooker is efficient and easily regulated so that a fire of a desired temperature may be maintained for relatively long periods to allow slow, even cooking. The cooker is also adapted to perform all the regular types of cooking. The improved firebox allows the fire to be started at a point remote from the cooker and also allows refueling of the fire and the removal of ashes during the cooking period without causing appreciable temperature variations and without causing the ashes to fly about the interior of the cooker. The cooker also prevents grease or juice from dripping into the fire by allowing the food to be spaced horizontally from the fire while at the same time directing substantially all the heat of the fire to the food. The fireboxes, drip pan, and grill of the cooker which are soiled during the cooking operation are made removable for easy cleaning. The efficiency of the cooker permits it to be constructed in relatively small sizes so that it is readily moved or stored as desired.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A portable cooker for cooking with fuel briquets comprising a hollow sheet metal enclosure having a generally horizontal top and bottom, an aperture in said top and in said bottom, a cooking grill detachably mounted in said aperture in said top, a pair of generally parallel vertical side panels on said enclosure spaced outwardly of said aperture in said top and each having an elongated generally horizontal aperture in its lower portion extending substantially along its entire length, a pair of heat director plates mounted within the hollow enclosure each sloping inwardly and upwardly from a position above the aperture in each one of said side panels to a position adjacent the outer edge of the cooking grill, a pair of fireboxes removably mounted on said enclosure below said heat director plates, each of said fireboxes comprising first and second imperforate elongated plate members attached together along one of their longer edges to form a firebox having a generally V-shaped lateral cross section, lateral end pieces connecting the shorter ends of said elongated plate members, each of said fireboxes having its vertex resting on the bottom of the metal enclosure adjacent said apertures in said side panels, retaining means on said bottom for said vertex removably positioning said firebox in a cooking position with its first elongated plate member extending upwardly through the adjacent side panel aperture with its top edge engaging the outer surface of the side panel above the aperture and with the second elongated plate member extending inwardly from each side panel to support burning briquets, each of said fireboxes being adapted to tilt outwardly of the enclosure about the vertex to a fire-starting position with the first elongated plate member extending outwardly of the side panel and with the second elongated plate member in a generally vertical position adjacent to the side wall aperture abutting an inner portion of said hollow enclosure, and a drip pan in the bottom of the hollow enclosure beneath said cooking grill and intermediate the two fireboxes and having generally parallel edges spaced from the inner edges of said second elongated plates when the fireboxes are in their cooking position to permit the entry of air to the fireboxes.

2. The cooker as claimed in claim 1 in which the horizontal distance between the innermost edges of the two fireboxes in their cooking position is equal to about twice the vertical distance between the innermost edges of the two fireboxes in their cooking position and the plane of the cooking grill.

References Cited in the file of this patent

UNITED STATES PATENTS

| | | |
|---|---|---|
| 7,595 | Knight | Aug. 27, 1850 |
| 133,231 | Lapaire | Nov. 19, 1872 |
| 155,236 | Greentree | Sept. 22, 1874 |
| 174,650 | Williams | Mar. 14, 1876 |
| 398,573 | Bending | Feb. 26, 1889 |
| 475,197 | Carr | May 17, 1892 |
| 548,499 | Ashmore | Oct. 22, 1895 |
| 580,753 | Barnard | Apr. 13, 1897 |

(Other references on following page)

UNITED STATES PATENTS

| | | |
|---|---|---|
| 617,122 | Ray | Jan. 3, 1899 |
| 697,506 | MacCulloch | Apr. 15, 1902 |
| 713,635 | Harris | Nov. 18, 1902 |
| 1,028,012 | Foster | May 28, 1912 |
| 1,111,129 | Boxall | Sept. 22, 1914 |
| 1,595,846 | Wood | Aug. 10, 1926 |
| 2,077,687 | Goldbert et al. | Apr. 20, 1937 |
| 2,095,745 | Hiatt | Oct. 12, 1937 |
| 2,101,180 | Jacobs | Dec. 7, 1937 |
| 2,441,994 | Pasquale | May 25, 1948 |
| 2,502,685 | Warner | Apr. 4, 1950 |
| 2,510,856 | Bettencourt | June 6, 1950 |
| 2,512,223 | Contiguglia | June 20, 1950 |
| 2,520,578 | Treloar | Aug. 29, 1950 |
| 2,598,067 | O'Brien | May 27, 1952 |
| 2,626,559 | Rau | Jan. 27, 1953 |
| 2,666,425 | Hastings | Jan. 19, 1954 |
| 2,746,377 | Parks | May 22, 1956 |
| 2,748,691 | Johnson | June 5, 1956 |
| 2,786,463 | Vincent | Mar. 26, 1957 |